United States Patent [19]

Kar et al.

[11] Patent Number: 4,531,959
[45] Date of Patent: Jul. 30, 1985

[54] METHOD AND APPARATUS FOR COATING OPTICAL FIBERS

[75] Inventors: Gitimoy Kar, Painted Post; Thomas O. Mensah, Big Flats, both of N.Y.

[73] Assignee: Corning Glass Works, Corning, N.Y.

[21] Appl. No.: 657,515

[22] Filed: Oct. 4, 1984

[51] Int. Cl.³ .............................................. C03B 25/02
[52] U.S. Cl. ...................................... 65/3.11; 65/3.12;
65/11.1; 65/13; 118/68; 118/125; 118/234
[58] Field of Search ....................... 65/3.11, 3.12, 10.2,
65/11.1, 13; 427/163; 118/68, 234, 125

[56] References Cited
U.S. PATENT DOCUMENTS 4,076,510  2/1978  Mracek et al. ................... 118/125 X
4,249,925  2/1981  Kawashima ......................... 65/13 X
4,427,717  1/1984  Gauthier ............................ 65/3.11 X
4,455,159  6/1984  Lamb et al. ........................ 65/3.11

*Primary Examiner*—Robert Lindsay
*Attorney, Agent, or Firm*—W. J. Simmons, Jr.

[57] ABSTRACT

Optical fibers are coated under pressure to reduce the amount of bubbles entrapped in the coating and provide good coating concentricities. The fiber is drawn axially thru a thin-walled, cylindrical flow distribution sleeve which is located between a guide die and a sizing die. The sleeve contains a plurality of evenly distributed holes the number and size of which is such that radial flow of liquid toward the fiber is maintained over the entire length of the sleeve which is less than 1.27 cm.

7 Claims, 9 Drawing Figures

METHOD AND APPARATUS FOR COATING OPTICAL FIBERS

BACKGROUND OF THE INVENTION

This invention relates to a method and apparatus for coating an elongated filament. More particularly, it relates to a method and apparatus for applying to an optical waveguide fiber a concentric coating having a low incidence of bubbles.

Glass optical waveguide fibers must exhibit high strength in order to withstand the stresses which are encountered in incorporating them into protective sheathing or cable, installing the cable, or in use. While such fibers are typically quite strong as drawn from a preform crucible or the like, this strength is rapidly degraded by surface defects which are introduced into the fiber through handling or otherwise.

To preserve the strength of a newly drawn fiber, it is conventional to apply to the fiber immediately after it is drawn a thin protective coating composed of an organic or inorganic coating material to protect it from surface abrasion during subsequent handling.

Tapered dies of the type employed for the application of coatings to conductive wires cannot be used for coating glass optical fibers. In one such die, the wire is maintained in a central position within the extrusion die by a tip orifice which is just large enough to permit the conductive wire to pass therethrough. Although such an apparatus is suitable for centering a conductive wire within a coating die, it would obviously be unsuitable for coating glass optical fibers which must not touch any solid surface prior to or during the coating step.

Apparatus for coating glass optical fibers typically comprises a reservoir containing coating fluid, a small, exit orifice being situated at the bottom thereof. The reservoir may consist of a tapered die having means at the top thereof or along the sidewall thereof for introducing coating liquid under pressure. The reservoir can also have a cylindrical or other suitable shape in which case the bottom surface thereof is usually provided with a tapered die. The fiber enters the coating liquid at the surface thereof and exits through the die orifice. Downward movement of the fiber through the free surface of the coating fluid generates a downwardly extending meniscus at the surface. At relatively low flow rates the meniscus is properly positioned, in part by the shape of the reservoir, thus centering the fiber within the coating.

Fibers can be more economically produced by increasing the draw rate. However, as speeds exceed 3 m/s, secondary flows within the coating liquid become intensified, and the fiber begins to draw air into the coating fluid. The fiber is thus incompletely wet by the fluid, and air bubbles accumulate in the coating liquid. Bubbles which get entrapped in the secondary flow motion within the liquid cannot escape to the top surface thereof. As bubble density increases, some bubbles pass through the die and remain in the coating. Bubble generation and secondary flows inside the applicator reduce the efficiency of fluid centering forces inside the applicator. The result can be poor coating concentricities and poor coating characteristics such as coating separation and incomplete curing.

In accordance with the teachings of U.S. Pat. No. 4,374,161 the fiber is pulled through a coating chamber passage that extends axially through a feed cylinder. Coating liquid is directed under pressure radially inwardly toward the fiber. The coating liquid is subjected to high pressure for the purpose of preventing air from entering the passage as the fiber is pulled therethrough. A passage diameter of from 1.5 to 5 times the fiber diameter is said to be sufficiently large to prevent contact of the fiber with the sides of the passage. In one specific example described in that patent, the cylinder contains many small radially-extending rectangular holes, there being four circumferentially spaced holes per 0.03 inch thick section, each hole having a cross-sectional area of 0.00004 in$^2$ (0.00026 cm$^2$). Extremely high pressures are required for delivering an adequate amount of coating liquid to the fiber drawn at 1 m/sec, said example specifying a pressure of 200 psi at a coating temperature of 160° C. Furthermore, in order to supply the fiber with a sufficient amount of liquid, a cylinder length of 1.5 inch (3.8 cm) was required. Draw speeds as low as 3 m/sec would require an inordinately high pressure. Also, any instability caused by such higher draw speeds increases the probability of the fiber contacting the surface of the small diameter coating chamber.

SUMMARY OF THE INVENTION

It is therefore an object of the present invention to provide a method and apparatus for applying low bubble content coatings to optical fibers drawn at speeds exceeding 3 m/sec.

Another object of the invention is to provide an optical fiber coating process which requires a relatively low pressure to deliver the coating liquid to the coating chamber.

A further object is to provide an apparatus for applying coatings of uniform thickness and concentricity to optical fibers while preventing the fibers from contacting the walls of the coating chamber.

Briefly, the apparatus of the present invention comprises a sizing die and a sleeve having fiber input and output ends, the output end being situated adjacent the sizing die. The sleeve has an inside diameter ID and has a plurality of feed holes of diameter d through the wall thereof. Means is provided for supplying coating liquid to an inner flow chamber which surrounds the sleeve. The present invention is characterized in that the length l of the sleeve is less than 1.27 cm and the ratio ID/l is between 0.3 and 1.0.

The coating apparatus of the present invention can be employed to apply a coating layer to a bare fiber or to an intermediate coated layer that had previously been applied to the fiber to obtain a composite coating. A coating liquid is directed under pressure substantially radially inwardly toward the fiber while the fiber passes through a central chamber in the coater. The method of this invention is characterized in that the substantially radial flow of the liquid is maintained over a length of the fiber of less than 1.27 cm by drawing the fiber through a sleeve having holes through the wall thereof, the axial region within the sleeve constituting the central chamber. Due to the novel construction of the present coater, the coating liquid is supplied to the outer surface of the sleeve at a pressure less than 50 psi for draw speeds greater than 3 m/sec.

In order to achieve such low pressure operation the hole diameter d should be at least 0.025 inch 0.064 cm. Diameter d is preferably no greater than 0.102 cm in order to provide the aforementioned substantially radial flow of coating liquid along the length of the central coating chamber. The substantially radial flow of liquid is also facilitated by maintaining the sleeve diameter ID no greater than 0.76 cm. The minimum value of diameter ID to prevent fiber abrasion against coater components is 0.38 cm.

DETAILED DESCRIPTION OF THE INVENTION

It is to be noted that the drawings are illustrative and symbolic of the present invention and there is no intention to indicate scale or relative proportions of the elements shown therein.

Figure 1:
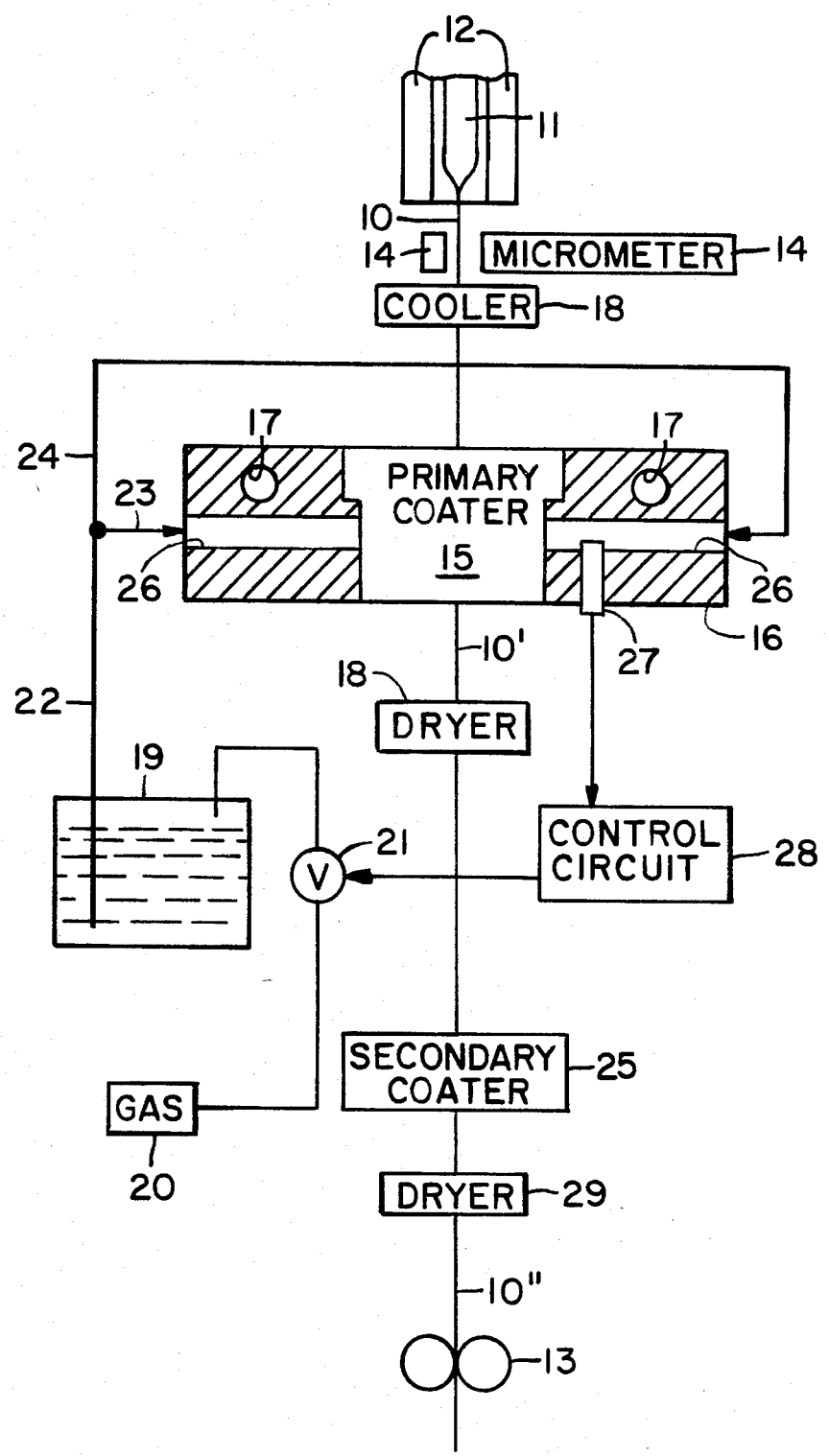
FIG. 1 is a schematic illustration of an apparatus for drawing and coating optical fibers.

Referring to FIG. 1 there is shown an apparatus for drawing an optical waveguide fiber 10. In the illustrated embodiment, the fiber is pulled by tractors 13 from a preform 11, the tip of which is softened in furnace 12. Other fiber forming techniques such as drawing from a melt can also be employed. Fiber 10 may consist of a glass core surrounded by a layer of cladding glass of lower refractive index than the core. Alternatively, fiber 10 may consist solely of core glass, the plastic material applied thereto in coater 15 comprising the cladding.

Coater 15, which is mounted in support apparatus 16, is positioned between the furnace and tractors to enable the fiber to be coated before its surface can become abraided. The coated fiber is designated by the numeral 10'. Two bores 17 conduct temperature controlling liquid through apparatus 16. Means 14 may be provided between the coater and the furnace for measuring the fiber diameter and determining the position of the fiber. Also, means 18 may be provided for cooling the fiber before it enters the coater. The coated fiber may be subjected to heat or ultra violet light in dryer 18 to cure the coating. Apparatus 16 may be mounted on an X-Y positioner (not shown) which can be employed to move the coater so that the orifices thereof are aligned with the drawn fiber.

Liquid coating material is stored in pressurized reservoir 19. Various well known coating materials such as UV curable, heat curable and thermoplastic polymeric materials are suitable for use in the present apparatus. A regulated gas source 20 is connected to reservoir 19 by way of pressure regulator 21 which is utilized to control the pressure within reservoir 19. A gas which has no adverse effect on the coating material should be employed, e.g. air, inert gas or the like. Lines 22, 23 and 24 connect reservoir 19 to inlet ports 26 of apparatus 16. A pressure transducer 27 in one of the ports 26 detects the pressure of the coating liquid and provides a signal to control circuit 28. The control circuit is also provided with a signal that is indicative of the fiber draw rate. As draw rate is increased, the signal from circuit 28 causes valve 21 to open wider so that the coating liquid pressure is correspondingly increased in order to provide a sufficient amount of liquid to coat the fiber.

The coating liquid delivery lines, reservoir 19, apparatus 16, transducer 27 and the components within coater 15 must be formed of materials such as metal, plastic or the like that do not adversely affect the particular coating material that is being applied. If the pressure of the liquid within inlet ports 26 can be maintained sufficiently low, ie. below 50 psi, the aforementioned lines, transducer and the fluid couplings therefor need not be designed for high pressure operation.

A further layer of coating material may be applied to coated fiber 10' by a secondary coater 25 which is similar to coater 15 except for its sizing die which must be made larger to accomodate the greater diameter of final coated fiber 10''. The coating liquid feed apparatus for coater 25 is not shown since it is identical to the apparatus employed in conjunction with coater 15. The application of two coatings to optical fibers is discussed in the publication: D. Gloge, Bell System Technical Journal, Vol. 54, No. 2, Feb. 1975, pp 245-262.

Figure 2:
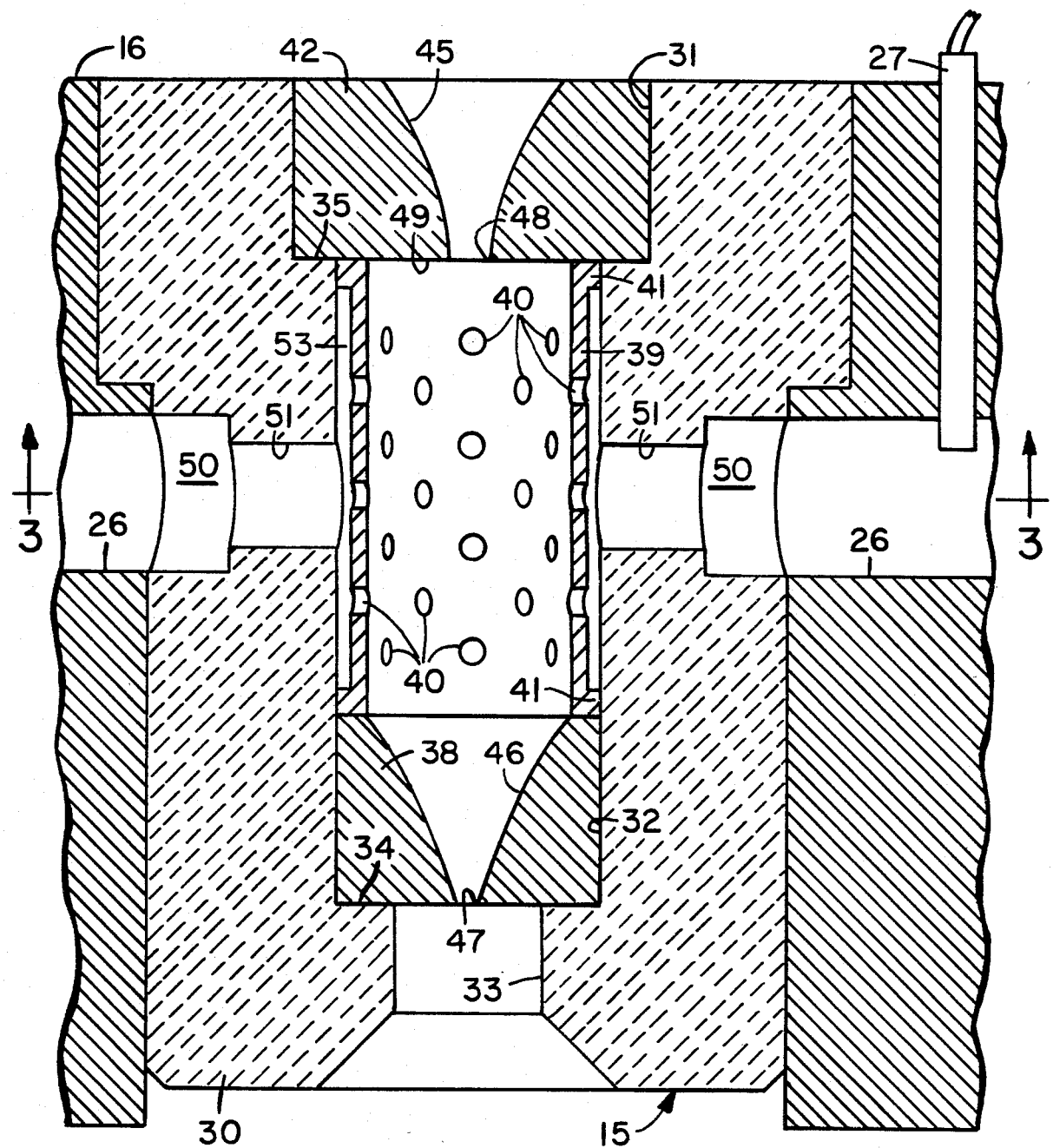
FIG. 2 is a cross-sectional view of a coater assembly for use in the draw apparatus of FIG. 1.

FIG. 2 is a cross-sectional view of coater 15 and the adjacent portion of apparatus 16. Coater 15 comprises a cylindrically-shaped housing 30 having longitudinally-spaced, coaxial bores 31, 32 and 33 extending vertically therethrough. Housing 30 may be formed of machinable ceramic, machinable glass-ceramic, metal or the like. Bores 32 and 33 meet to form an inwardly projecting shoulder 34 upon which sizing die 38 is seated. Immediately above die 38 is a cylindrical, flow distribution sleeve 39 having a plurality of feed holes 40 therethrough. Sleeve 39 is provided with flanges 41 at one or both ends thereof to center it within bore 32. A guide die 42 is seated above sleeve 39 on a shoulder 35. Guide die 42 and sizing die 38 have tapered longitudinal apertures 45 and 46, respectively. Aperture 46 extends to the bottom surface of die 38 to define a sizing orifice 47. The size of orifice 47 is determined by various parameters including the diameter of the optical fiber to be coated, the thickness of the coating and the particular coating material employed. Orifice 48, which is situated at the bottom of aperture 45, is somewhat larger than orifice 47. Sizing die 38 and guide die 42 may be formed of stainless steel, brass, tungsten, ceramic or the like.

Housing 30 is provided with an outer flow chamber comprising annular slot 50, which is aligned with inlet ports 26, and a plurality of radially-extending bores 51. An inner flow chamber 53 is situated between sleeve 39 and the wall of bore 32. Coating liquid from reservoir 19 flows through ports 26 to annular slot 50 where it is distributed to radial bores 51. The liquid then flows into inner chamber 53 where it surrounds sleeve 39. The outer chamber comprising slot 50 and bores 51 provides uniform flow to the entire circumference of the inner chamber 53 and prevents pressure surges from reaching the fiber.

The coating liquid then flows through holes 40 and continues radially inwardly to the fiber. The radial pressure of the liquid decreases the intensity of recirculation currents in the coater. That is, the kinetic energy of the eddies, which tend to flow in the liquid because of the rapid movement of the fiber therethrough, is absorbed by the radial momentum of the fluid. An adequate radial flow also decreases the extent of the meniscus depression, thereby preventing the creation of an air envelope around the fiber as well as the resultant separation of the liquid from the fiber. The fluid pressure within sleeve 39 should be sufficiently high that the meniscus occurs in the vicinity of guide die orifice 48 rather than at the lower end of sleeve 39. The bottom surface 49 of guide die 42 prevents the fluid from flowing upwardly beyond sleeve 39 after proper fluid flow conditions have been established. It is thought that the pressure within ports 26 will never have to exceed 30 psi.

The presence of guide die orifice 48 facilitates the initial feeding of fiber 10 through the coater. It causes an inserted fiber to be centered so that it will readily pass through the coater and out of the sizing die orifice without becomming snagged within cylinder 39. Orifice 48 is sufficiently large that the fiber does not come into contact with it during the fiber drawing and coating operation.

The distance between orifices 47 and 48 should be as small as possible to prevent fiber abrasion. As this distance becomes larger, a slight vertical misalignment of the coater with respect to the fiber will bring the fiber into close proximity to the orifice-forming regions of dies 38 and 42. Also, a longer flow chamber produces a greater viscous drag on the fiber which can cause breakage at higher draw rates. Therefore, the length l of sleeve 39 should be no greater than 1.27 cm. The actual length of sleeve 39 is determined by the amount of fluid that has to be delivered to the fiber, a parameter which is also related to the total area of feed holes 40 and the applied pressure. The diameter d of holes 40 should be in the range of 0.064 cm and 0.102 cm. A diameter less than 0.064 cm causes the pressure to exceed the previously mentioned acceptable level. If the diameter of holes 40 were too large, the coater would begin to function as if sleeve 39 were not present. In this latter situation the coating liquid would no longer flow radially inwardly toward the fiber with uniform pressure from all azimuthal directions.

The inside diameter ID of sleeve 39 is a function of the length thereof. Whereas an inside diameter of 0.475 cm was employed in a system operating at 5 m/sec, an inside diameter of 0.643 cm was employed for operation at 10 m/sec. It is thought that satisfactory operation can be achieved by coaters of the described type wherein the inside diameter is between 0.38 and 0.76 cm. A sleeve having a diameter smaller than 0.38 cm is more likely to contact the drawn fiber, and one having a diameter greater than 0.76 cm is not likely to be able to provide the necessary radial flow to overcome the recirculating flow in the coater. It has been noted that when the hole diameter d and sleeve inside diameter ID are determined in accordance with the above criteria, the ratio ID/l falls within the range between about 0.3 and 1.0 and preferably between 0.65 and 0.7.

Cylinder 39 is preferably formed of a metal such as stainless steel. The wall thickness of the cylinder is the minimum necessary to provide adequate mechanical strength. Such a thin wall is advantageous in that it causes a small pressure drop and does not adversely affect the properties of the coating liquid such as rheology. When cylinder 39 was formed of stainless steel, a wall thickness of 0.042 cm was adequate. If sleeve 39 were formed of ceramic or plastic material its thickness would have to be at least twice the aforementioned thickness of 0.042 cm or at least about 0.8 cm because it is more difficult to machine those materials.

Figure 4:
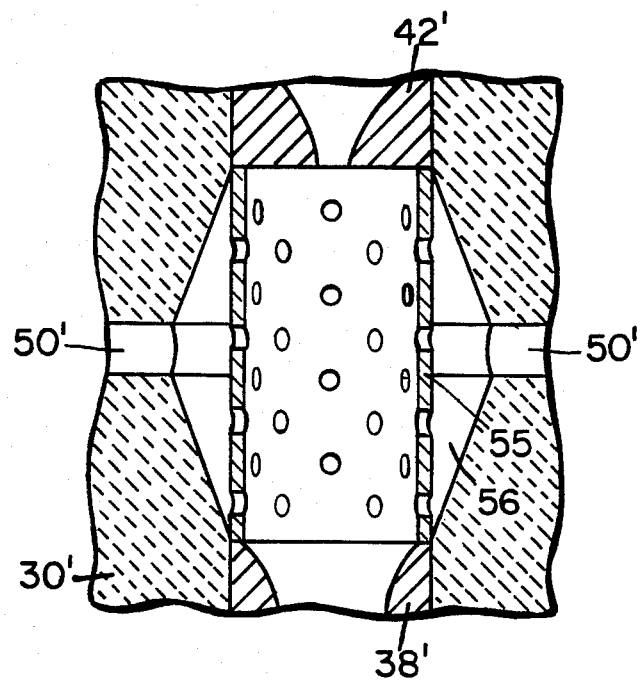
FIGS. 4 and 5 are partial cross-sectional views of coater assemblies having modified outer flow chambers.
Figure 5:
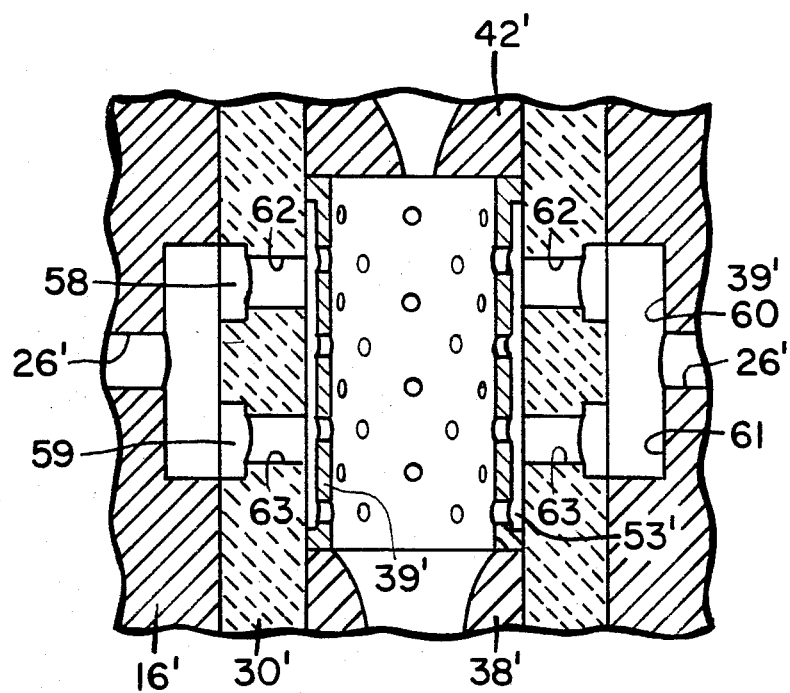

Coaters having modified outer or inner feed chambers are illustrated in FIGS. 4 and 5. Elements in these figures which are similar to those of FIG. 2 are represented by primed reference numerals.

In FIG. 4 annular slot 50' surrounds the central portion of sleeve 55. However, the bores 51 of FIG. 2 are replaced by annular cavity 56 which tapers from its largest diameter at slot 50' to its smallest diameter at the top and bottom ends of sleeve 55. Since cavity 56 is formed within housing 30', sleeve 55 need not have flanges at its ends for spacing it from housing 30'. This type of manifold very uniformly distributes the coating liquid to the entire outer surface of the feed cylinder.

The embodiment of FIG. 5 also provides uniform flow to all portions of sleeve 39'. Housing 30' is provided with two outer flow chambers, one of which comprises annular slot 58 and the other, annular slot 59. These slots are aligned with branches 60 and 61 of inlet port 26'. A plurality of bores 62 extend radially inwardly from slot 58 to inner chamber 53', and a plurality of bores 63 extend radially inwardly from slot 59 to chamber 53'.

Figure 6:
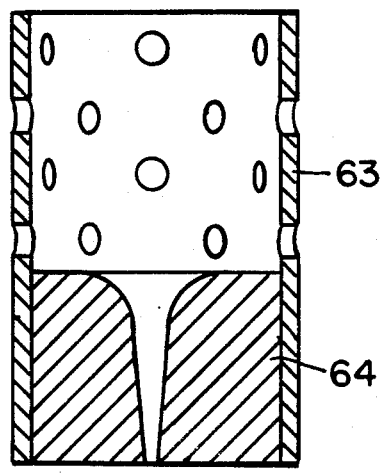
FIG. 6 is a cross-sectional view of a modified flow distribution sleeve in which the guide die is located within the lower portion thereof.

The embodiment of FIG. 6 employs a sleeve 63, the lower end of which is extended. Sizing die 64 is located in the lower end of sleeve 63 which is free from holes. Location of sizing die 38 within the flow distribution sleeve facilitates the precise alignment of their longitudinal axes. It may even be possible to fabricate the sizing die and flow distribution sleeve as a unitary structure. However, cleaning techniques would have to be developed for any of these embodiments. It is noted that the embodiment of FIG. 2 can be easily cleaned since it is readily disassembled.

Figure 3:
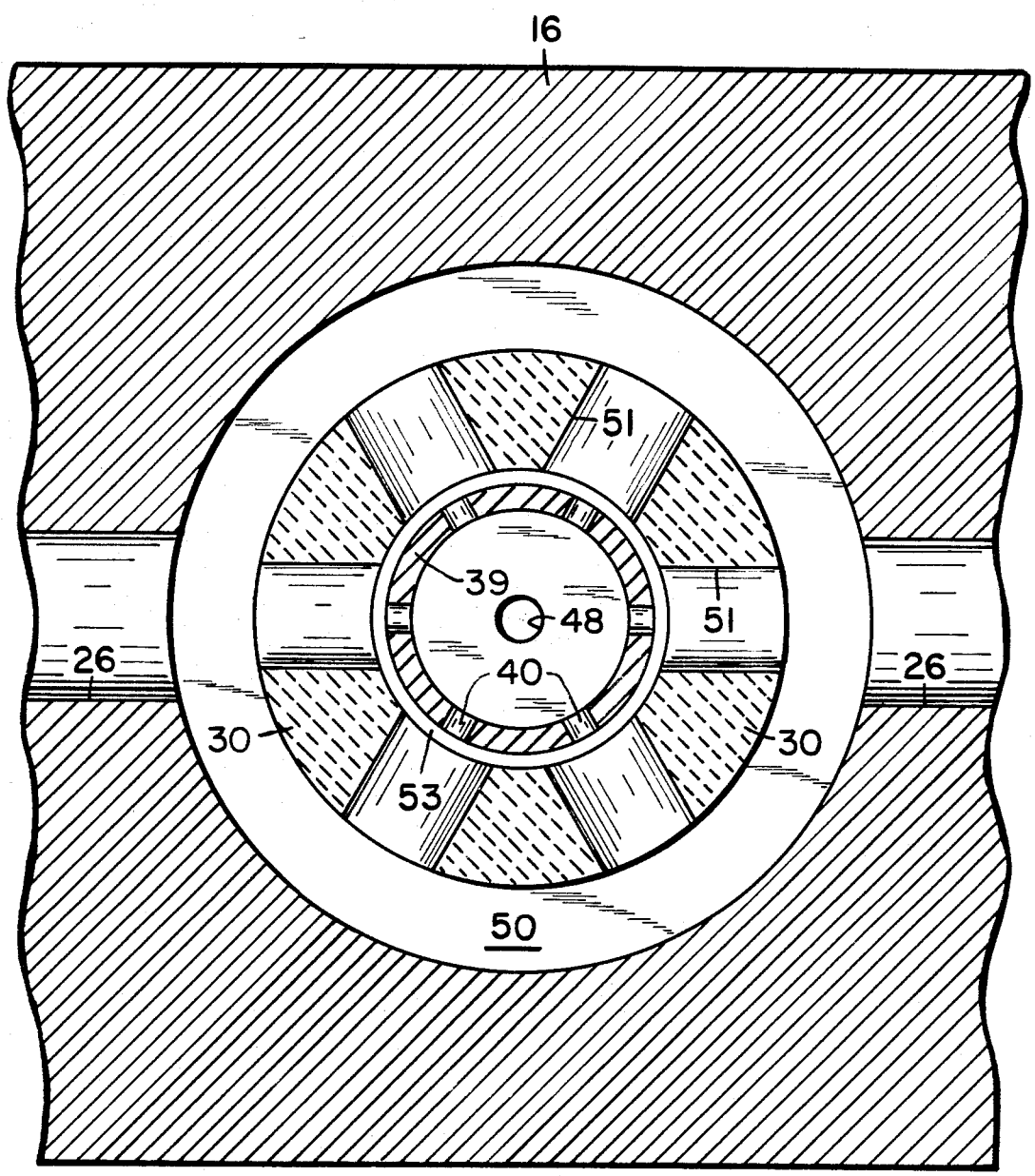
FIG. 3 is a cross-sectional view taken along lines 3—3 of FIG. 2.

Apparatus of the type shown in FIGS. 1-3 was employed to apply coatings to various types of fibers, viz. pure silica fibers, single-mode fibers and multimode fibers. The single-mode and multimode fibers were both high in silica content. The glass fiber diameter was 125 $\mu$m in all cases. Prior to entering coater 15, the fiber was cooled by flowing cooled helium thereover. Guide die 42 and sizing die 38 were both 0.488 cm high. The diameter of orifice 48 is sufficiently large that fiber 10 can pass therethrough without touching the sides. It is usually at least 1.5 to 2 times the diameter of the sizing die orifice. The diameter of orifice 47 was 250 $\mu$m. The angle of aperature 46 was 6° at the tip and was shaped as shown in FIG. 6.

To ascertain the effect of various characteristics of the flow distribution sleeve 39, fiber draw runs were carried out wherein both the primary and secondary coaters employed sleeves characterized by I through V of the following table. All sleeves were made of 0.042 cm thick stainless steel. The diameter d of the holes 40 was always 0.079 cm. Sleeve parameters which were varied were sleeve length l, inside diameter ID, total number of holes N and number of holes per row n/row.

|  | Sleeve Type | | | | |
| --- | --- | --- | --- | --- | --- |
|  | I | II | III | IV | V |
| l (cm) | 0.709 | 0.709 | 1.064 | 0.709 | 1.104 |
| ID (cm) | 0.559 | 0.559 | 0.839 | 0.447 | 0.447 |
| N | 24 | 48 | 36 | 24 | 36 |
| n/row | 6 | 6 | 6 | 6 | 6 |

In a first embodiment, a type I sleeve was employed. A flange 41 located at the bottom end of the sleeve had a diameter of 0.643 cm whereby it fit snugley into bore 32 the inside diameter of which was 0.643 cm. Inner flow chamber 53 was therefore 0.635 cm long and 0.042 cm thick. The outer flow chamber consisted of six 0.32 cm diameter bores 51 and a slot 50 which had a height slightly larger than the bore diameters. Container 19 was filled with a UV curable urethane acrylate which had a viscosity of 80 poise at 25° C.

Secondary coater 25 was identical to primary coater 15 except for the diameter of sizing die orifice 47 which was larger to accomodate the desired secondary coating thickness. The secondary coater was used to apply over the first coating a coating of UV curable epoxy acrylate which had a viscosity of 100 poise at 25° C.

Fiber 10 was threaded through the guide die and sizing die of coater 15, through dryer 18, through the guide die and sizing die of coater 25, through dryer 29 and engaged by tractor 13. A television camera was directed toward each of the sizing die orifices so that the position of the fiber therein could be observed on monitors. Each coater, which had been initially leveled, was moved until the fiber, as viewed on the monitor, appeared to be centrally located within its sizing die orifice. Water was circulated through bores in the coater housings. The temperature of the coating liquids was normally maintained between 25° C. and 35° C.

Figure 7:
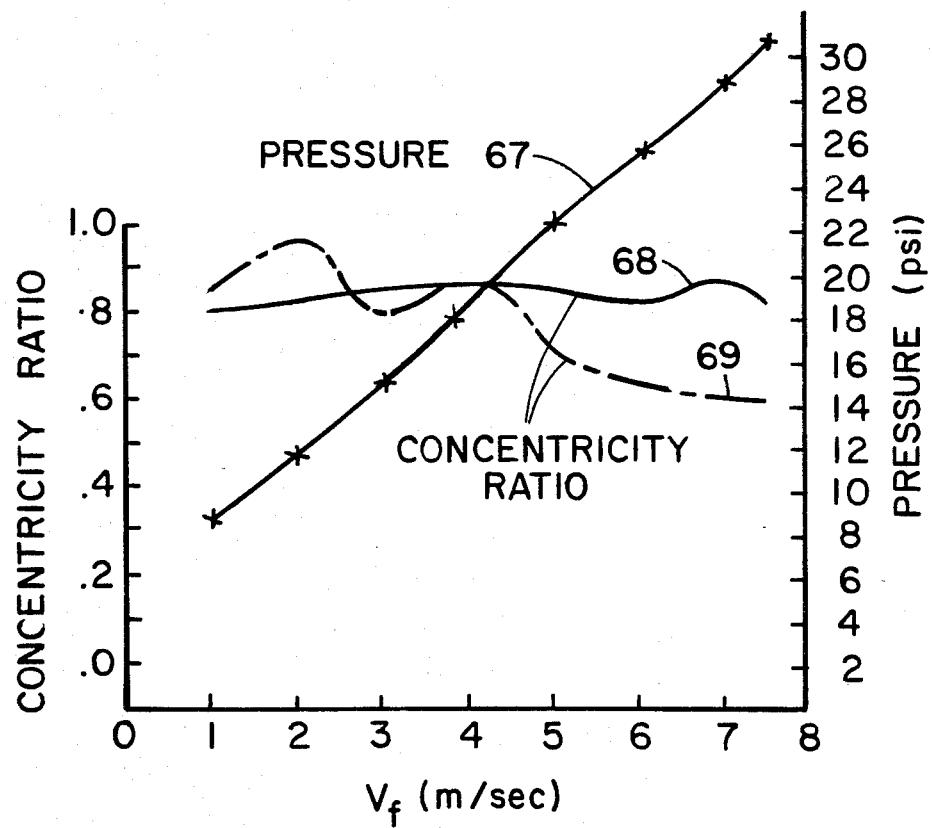
FIGS. 7, 8 and 9 are graphs of primary coating concentricity ratio plotted as a function of fiber draw rate $V_f$ for various flow distribution sleeves.

Coaters 15 and 25 were operated in a similar manner. The following specific details concerning coater 15 are equally applicable to coater 25. Sections of fiber 10″ having primary and secondary coatings thereon were analyzed under a microscope to determine the bubble count per 100 μm length and the coating concentricity. Even though both coatings were present, the bubble count and concentricity were determined only for the primary coating. The secondary coating was routinely found to be of equal quality. As used herein the term "coating concentricity" means the minimum coating thickness divided by the maximum coating thickness. Pressure regulator 21 was manipulated to slowly increase the pressure to permit the coater feed lines and coater to fill and to permit the coater to reach an equilibrium flow condition. The temperature of the coating liquids was 25° C. As the fiber draw rate $V_f$ was increased, in increments of one m/sec between 1 and 7 m/sec and finally to 7.5 m/sec, the fluid pressure required in inlet ports 26 to provide an acceptable coating had to be increased in accordance with curve 67 of FIG. 7. As the draw rate was increased up to 7.5 m/sec the coater of FIG. 2 (with a type I sleeve) continued to operate satisfactorily as indicated by curve 68 which indicates that the concentricity ratio was greater than 0.8 at all draw rates between 1 and 7.5 m/sec. It is undesirable for the concentricity ratio to fall below 0.7. The bubble count for the fiber coated with the above-described coater was less than 10 per 100 μm.

Insert 39 was removed and the apparatus was run as described previously, i.e. the pressure was again ramped upwardly with increased draw rate as indicated by curve 67. At a draw rate of about 5 m/sec, the concentricity ratio dropped below 0.7 and continued to decrease with increasing draw rate as indicated by curve 69. Also, the bubble count during this run was between 20 and 40 per 100 μm.

Figure 8:
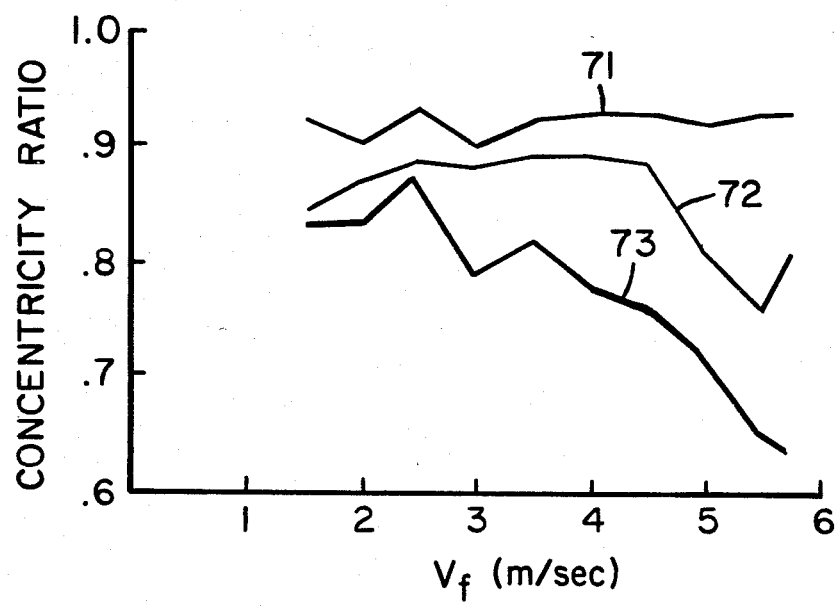

A further set of runs was carried out on another draw apparatus to ascertain the effect of increasing the total hole area of the sleeve. The temperature of the coating liquids for these runs was 25° C. Referring to FIG. 8, a type I sleeve resulted in an extremely good concentricity ratio for draw speeds up to almost 6 m/sec as indicated by curve 71. When the type II sleeve was inserted into the coater, the concentricity ratio decreased as indicated by curve 72. The type II sleeve was identical to the type I sleeve except that it had twice the number of holes. Curve 73 indicates the performance of the coater when no sleeve was employed.

Figure 9:
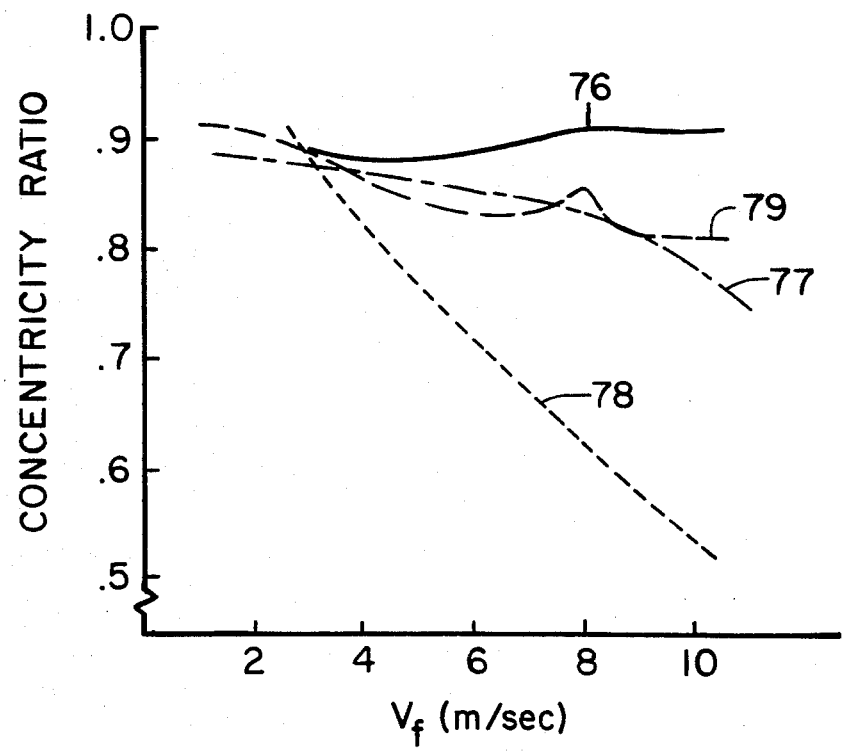

FIG. 9 illustrates the primary coating concentricity ratios obtained by using various sleeves in a coating apparatus as the draw rate was increased up to about 10 m/sec. The temperature of the coating liquids for these runs was 35° C. During the testing of various sleeves at draw rates of 10 m/sec, the maximum pressure varied between 20 and 40 psi. A maximum pressure of up to 50 psi may be needed to attain draw rates greatly in excess of 10 m/sec. Draw rates of 30 m/sec are presently envisioned.

The concentricity ratio was about 0.9 or greater for draw rates up to 10 m/sec, as indicated by curve 76, when a type III sleeve was employed. It is noted that the ID and length of the type III sleeve are both 1.5 times as large as the corresponding type I dimensions. Curve 77 illustrates the operation of a coater employing the type I sleeve at draw rates up to 10 m/sec.

Curve 78 illustrates the drastic decrease in concentricity ratio which occurs when a type IV sleeve was employed. Such levels of concentricity are unacceptable at higher speeds.

Curve 79 shows that an adequate concentricity ratio can be achieved when a type V sleeve is employed in the coater.

We claim:

1. An apparatus for coating a fiber comprising
a sizing die,
a sleeve having fiber input and output ends, said output end being situated at one end of said sizing die, said sleeve having an inside diameter ID and having a plurality of feed holes of diameter d through the wall thereof,
an inner flow chamber surrounding said sleeve, and
means for supplying coating liquid to said inner chamber,
said apparatus being characterized in that the length of said sleeve is less than 1.27 cm, the ratio ID/l is between 0.5 and 1.0 and the diameter d is between 0.064 and 0.125 cm.

2. An apparatus in accordance with claim 1 wherein ID is between 0.38 and 0.76 cm.

3. An apparatus in accordance with claim 1 wherein the wall thickness of said sleeve is less than 0.838 cm.

4. An apparatus in accordance with claim 1 further comprising means at the fiber input end of said sleeve for preventing said coating liquid from flowing from that end of said sleeve.

5. An apparatus in accordance with claim 4 wherein said means for preventing comprises a guide die having a tapered opening therethrough, the small diameter end of said guide die opening, which is situated adjacent said sleeve, being larger than the smallest diameter of said sizing die.

6. An apparatus in accordance with claim 1 further comprising a housing having a bore therethrough, the diameter of said bore being greater than the outside diameter of said sleeve, means for centering said sleeve within said bore, the space between said sleeve and the wall of said bore constituting said inner flow chamber, said means for supplying comprising an annular slot in said housing, and a plurality of radially extending bores connecting said slot to said axial bore.

7. A method of making a coated fiber by applying a coating layer to a bare fiber or to an intermediate coated layer thereon by directing under pressure a coating liquid substantially radially inwardly toward said fiber while said fiber passes through a chamber, characterized in that the substantially radial flow of said liquid is maintained over a length of the fiber of less than 1.27 cm by drawing said fiber through a sleeve having holes through the wall thereof the diameter of the holes being between 0.064 and 0.125 cm., the axial portion of said sleeve constituting said chamber, said coating liquid being supplied to the outer surface of said sleeve at a pressure less than 50 psi for draw speeds over 3 m/sec.

* * * * *

UNITED STATES PATENT AND TRADEMARK OFFICE
CERTIFICATE OF CORRECTION

PATENT NO. : 4,531,959

DATED : July 30, 1985

INVENTOR(S) : Gitimoy Kar et al.

It is certified that error appears in the above-identified patent and that said Letters Patent is hereby corrected as shown below:

Claim 1, last line (column 8, line 45), change "0.125 cm" to --0.102 cm--.

Claim 7, line 10 (column 10, line 3), change "0.125 cm" to --0.102 cm--.

Signed and Sealed this

Tenth Day of January, 1989

Attest:

DONALD J. QUIGG

*Attesting Officer*  *Commissioner of Patents and Trademarks*